United States Patent [19]

Grusin

[11] Patent Number: 4,512,497
[45] Date of Patent: Apr. 23, 1985

[54] COVERED DISH WITH ADJUSTABLE OPENING

[75] Inventor: Gerald M. Grusin, Chicago, Ill.

[73] Assignee: Dart Industries Inc., Northbrook, Ill.

[21] Appl. No.: 601,778

[22] Filed: Apr. 19, 1984

Related U.S. Application Data

[63] Continuation of Ser. No. 386,385, Jun. 8, 1982, abandoned.

[51] Int. Cl.³ .................... A47J 27/00; B65D 51/16; B65D 51/24
[52] U.S. Cl. .................................. 220/369; 126/389; 220/212; 220/367
[58] Field of Search ............... 220/366, 369, 370, 212, 220/367; 215/307, 308, 310; 126/38 H, 299 C, 381, 389; D7/16, 74, 391, 392

[56] References Cited

U.S. PATENT DOCUMENTS

| | | | |
|---|---|---|---|
| D. 217,732 | 6/1970 | Chlystun | D7/74 X |
| D. 219,670 | 1/1971 | Swett et al. | D7/16 X |
| D. 240,696 | 7/1976 | Tretter | D7/392 |
| 909,284 | 1/1909 | Collins | |
| 1,968,950 | 8/1934 | Maigret | 126/384 X |
| 1,973,449 | 9/1934 | Tighe, Jr. | |
| 1,978,175 | 10/1934 | Stallé | |
| 2,241,064 | 5/1941 | Harbison | |
| 2,412,325 | 12/1946 | Devine et al. | |
| 2,682,970 | 7/1954 | Brothers, Jr. | 220/366 X |
| 2,790,436 | 4/1957 | Pearcy | 126/384 |
| 2,867,352 | 1/1959 | Kawano | 126/299 C X |
| 2,907,467 | 10/1959 | Machate, Jr. | |
| 3,001,665 | 9/1961 | Tomarin | |
| 3,708,086 | 1/1973 | Colato | |
| 3,870,191 | 3/1975 | Franklin | 220/370 |
| 3,937,359 | 2/1976 | Stockton, Jr. | 220/369 |
| 3,985,990 | 10/1976 | Levinson | |
| 4,058,214 | 11/1977 | Mancuso | |
| 4,150,777 | 4/1979 | Cyr et al. | |

FOREIGN PATENT DOCUMENTS

| | | | |
|---|---|---|---|
| 20758 | of 1929 | Australia | 220/366 |
| 857860 | 7/1949 | Fed. Rep. of Germany | 220/366 |

OTHER PUBLICATIONS

Nordic Ware Brochure published 7/1979—2 Quart Casserole with a Vent/Access in the Handle.
Anchor Hocking Brochure Z-6971—4 Quart Cooker with Vent/Access in Each Handle.

Primary Examiner—Allan N. Shoap
Attorney, Agent, or Firm—John A. Doninger

[57] ABSTRACT

A cooking dish including a cover having at least one opening that allows controlled venting and access into the interior of the dish. At least one opening is formed in the periphery of the cover, and the dish has at least one ledge facing the cover. The opening in the cover may be blocked or unblocked to various degrees depending on where it is positioned over the ledge of the dish.

6 Claims, 9 Drawing Figures

COVERED DISH WITH ADJUSTABLE OPENING

This is a continuation of application Ser. No. 386,385, filed 6/08/82, now abandoned.

FIELD OF THE INVENTION

This invention relates in general to dishes for cooking, serving and storing food or the like. More particularly this invention relates to a dish including a cover with at least one opening which is adjustable between various open and closed positions by rotation of the cover on the dish.

BACKGROUND OF THE INVENTION

Dishes used for baking and other cooking applications typically are equipped with a cover so that the foodstuffs within the dish can be covered while being cooked. Covered cooking helps retain heat and moisture within the dish and may otherwise aid the cooking process. Even if covered cooking is not desired the cover can be used while serving to help keep the contents of the dish warm. The term "dish" is used in a general sense to mean ovenware such as a casserole dish suitable for use in an oven such as a microwave oven or a conventional oven. The term "dish" would also include a cooking utensil intended for use on a range-top cooking element.

For some cooking applications, it would be advantageous to provide an opening in the otherwise covered dish to allow carefully controlled amounts of steam or other vapors to escape. Further, while it may be desirable to keep a dish covered during cooking, it is nevertheless frequently desirable to gain access to the interior of the dish during cooking. For example, it may be convenient to insert a cooking thermometer into the dish without completely removing the cover. While serving it may be convenient to leave a serving spoon in the dish and yet keep the dish covered.

With some cooking dishes of the prior art, one must substantially remove the entire cover or lid in order to gain access to the interior of the dish. This is at best awkward, because the cook must either hold the removed lid in one hand or else must find a clean and heat-safe location on which the hot lid can temporarily rest. Moreover, removing the lid from a hot container carries the risk that the cook may be burned by the sudden and uncontrolled escape of steam from the container.

To need to provide an opening for venting steam from the dish or inserting a cooking thermometer may be met through the expedient of setting the lid ajar on the dish. This solution is awkward and usually difficult to regulate, and is undesirable. Another prior art venting expedient, usually limited to metal lids for saucepans or the like, requires a separate butterfly valve element movably attached to the cover. Such valves are not adjustable, easily become clogged, are relatively costly and in any case are not readily adaptable to ceramic or glass cookware such as bowls. Other prior art dishes have located a venting arrangement in the handle of the dish so that the escape of steam can cause a problem for a person handling the container. Locating the vent in such a fashion increases the likelihood that steam will condense on the handle making it hot or slippery or both.

SUMMARY OF THE INVENTION

The present invention overcomes the foregoing and other problems of the prior art by providing a dish having an open mouth and a cover which can be placed on the dish to close the open mouth. The cover and dish cooperate to form at least one adjustably sized opening which allows access to the interior of the covered dish. The opening can function as an adjustable vent to allow controlled amounts of steam or water vapor to escape from the dish. This opening also is sufficiently large to admit an implement such as a cooking thermometer or the shank of a spoon.

Stated somewhat more specifically, the cover includes an outer rim having an opening formed therein. The dish includes a ledge and flange which circumscribe the open mouth of the dish. Portions of the ledge function as handles. When the cover is in place on the dish it can be rotated to at least one angular position wherein the rim of the dish blocks the opening. The cover can be rotated to at least one other position removed from the handles, wherein the opening is unblocked. Thus access to the interior of the dish can be effected without taking the cover off the dish.

Accordingly, it is an object of the invention to provide an improved cooking dish.

It is another object of the invention to provide a covered cooking dish which allows access to the interior of the dish without removing the cover.

It is yet another object of the invention to provide a dish and cover having an adjustably sized opening into the interior of the dish, which allows controlled venting.

It is still another object of the invention to provide a dish and cover having an adjustable opening into the interior of the dish which is angularly removed from the portions of the dish which functions as a handle.

Other objects and advantages of the present invention will become more readily apparent from the following description of a preferred embodiment.

DESCRIPTION OF PREFERRED EMBODIMENT

Figure 1:
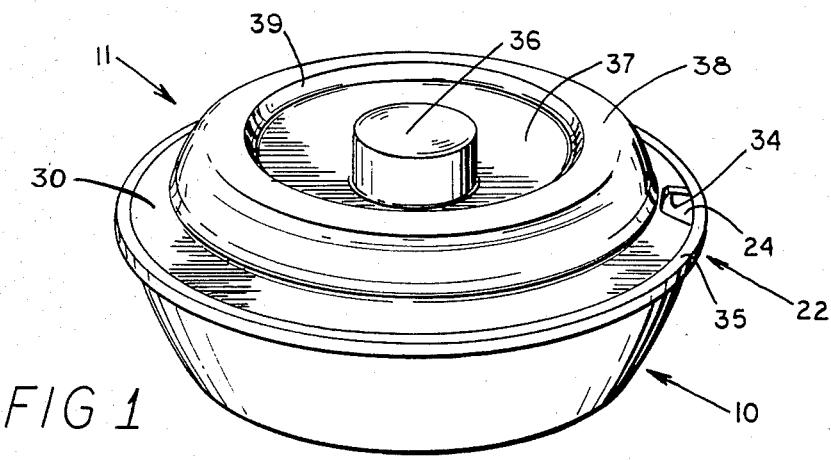
FIG. 1 is a top perspective view of the dish and cover.
Figure 2:
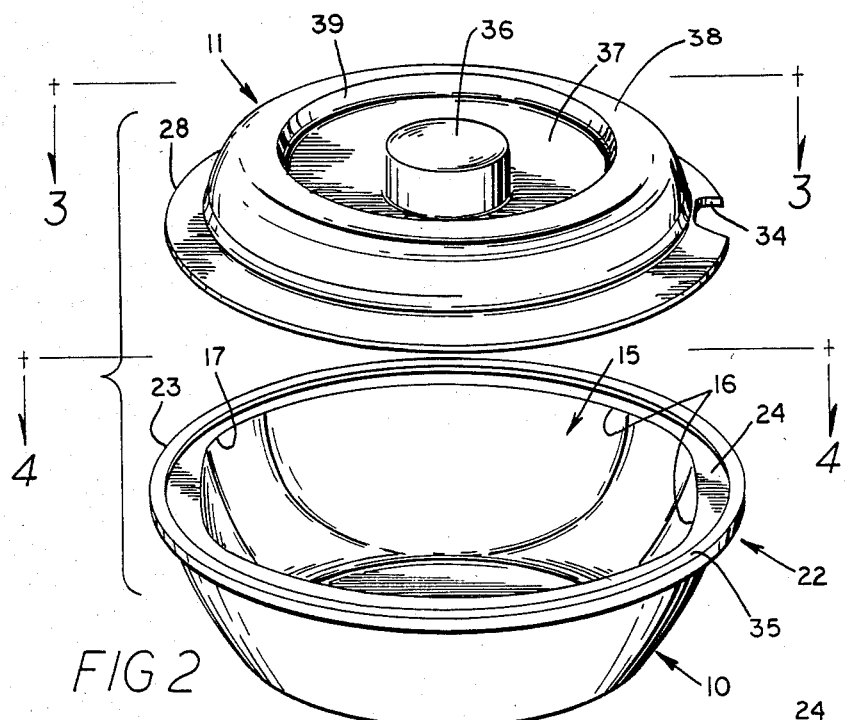
FIG. 2 is an exploded perspective view of the dish and cover shown in FIG. 1, with the cover elevated above the dish.

Looking first to FIGS. 1 and 2, there is shown a dish 10 and complementary cover 11. The disclosed dish and cover are intended to be used, for example, as a casserole dish or for other cooking purposes. Preferably, the dish 10 and cover 11 are made of any suitable material which can withstand both the high temperatures associated with cooking in an oven or on a range-top and the low temperatures associated with storage in a refrigerator or freezer.

Figures 3, 4:
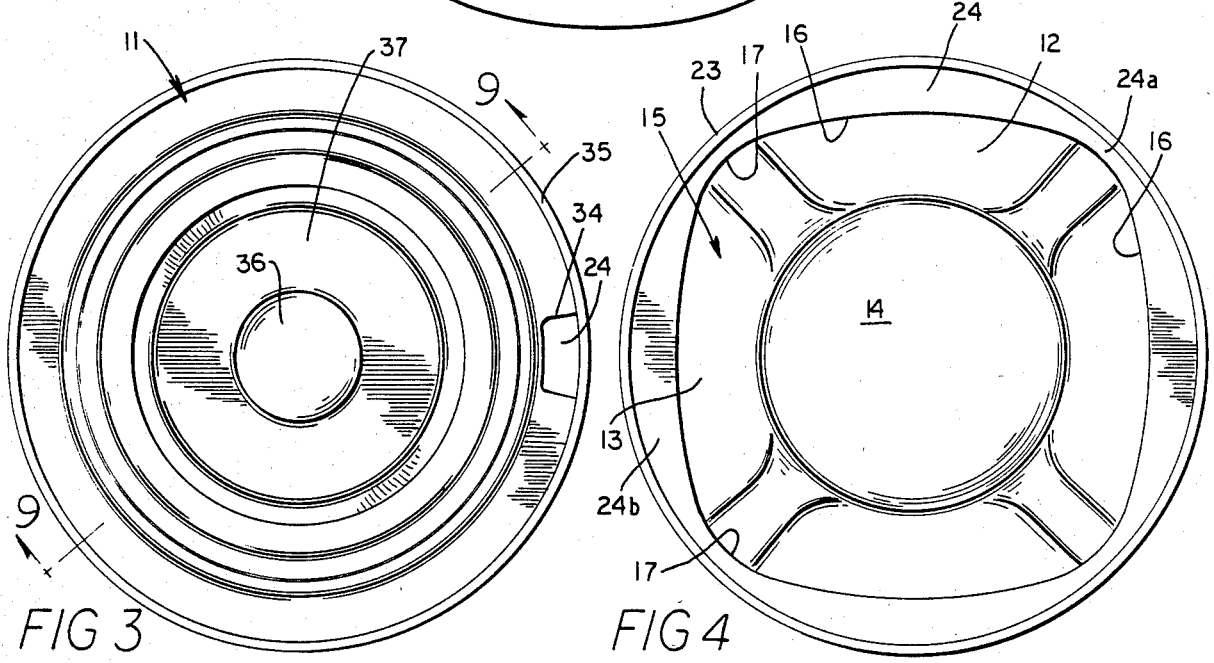
FIG. 3 is a top plan view of the covered dish shown in FIG. 1.
FIG. 4 is a top plan view of the dish, with the cover removed.
Figure 9:
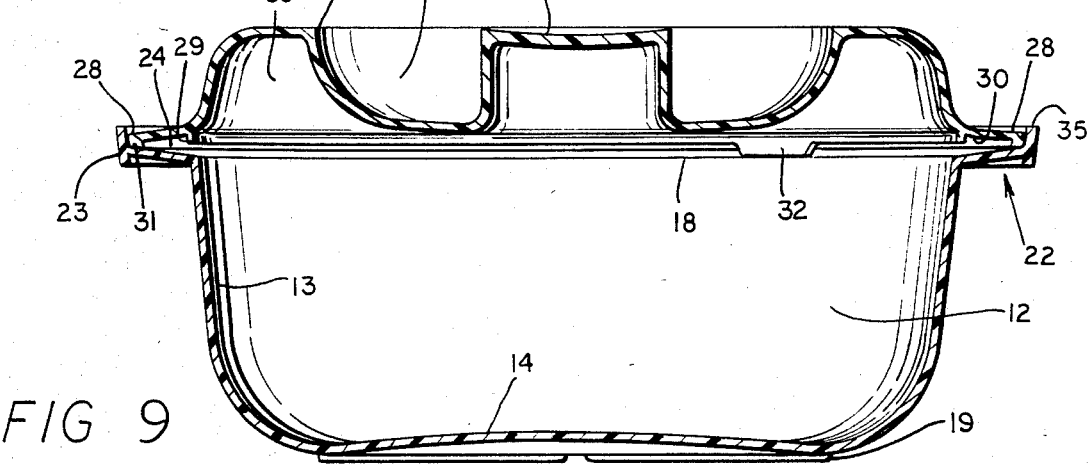
FIG. 9 is a cross-sectional view of the covered dish taken along line 9—9 of FIG. 3.

The dish 10, as best seen in FIGS. 2, 4 and 9, has a generally bowl-shaped interior 12 formed by the side wall 13 extending upwardly from the bottom wall 14, which is slightly convex at the center of the dish. The exterior of bottom wall 14 includes a downwardly extending projection 19 which is generally circular in bottom plan view. The projection 19 is not continuous but rather may be formed by a plurality of projections. The projections 19 serve as a base upon which the bowl rests when placed on a flat surface. The dish 10 has an open mouth 15 (FIGS. 2 and 4) having the approximate appearance of a square formed by outwardly-arcuate sides 16 interconnected by rounded corners 17. The sides 16 and corners 17 interconnect to form a continuous smooth edge 18 (FIG. 9) defining the open mouth 15 of the dish 10. It should be understood that the continuous smooth edge 18 can be in the form of other noncircular contours, such as an oval.

A rim 22 surrounds the open mouth 15 of the dish 10. The upper surface of the rim 22 includes an upwardly facing ledge 24 which extends between the edge 18 of the open mouth 15, and a flange 35. As can best be seen in FIG. 9, the ledge 24 angles downwardly from flange 35 towards the open mouth of the dish 10. The flange 35 angles slightly outwardly and is defined at its outer extremity by outer surface 23. Thus, the generally square shape of the open mouth 15 is circumscribed by the flange 35 of the rim 22. As a result the width of the ledge 24 varies between relatively narrow ledge portions 24a adjacent the corners 17 of the open mouth 15, and relatively wide ledge portions 24b adjacent the sides 16 of the open mouth. As can best be seen in FIG. 4, the relatively wide ledge portions 24b form convenient handles for picking up the dish 10.

As best shown in FIGS. 1 and 9, the cover 11 includes a handle 36 centrally located within a surrounding depression 37, so that the handle can be readily grasped through a potholder or other protective device. The perimeter of the depression 37 is defined by an edge 39 which is generally circular in top plan view. Extending outwardly and downwardly from edge 39 is a region 38 which merges with an outer rim 30.

Figure 6:
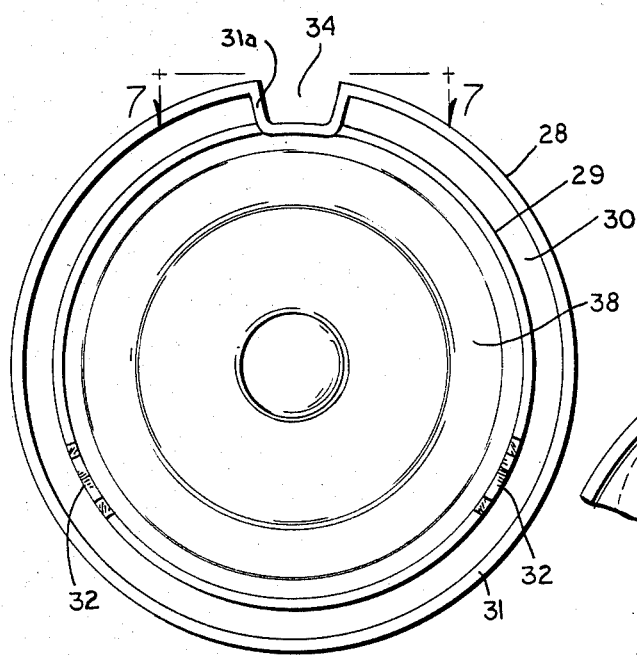
FIG. 6 is a bottom plan view of the cover, taken along line 6—6 of FIG. 5.
Figure 7:
FIG. 7 is a fragmentary view taken along line 7—7 of FIG. 6.

The outer rim 30 is defined by a generally circular outer edge 28. As best shown in FIGS. 3 and 9, the diameter of the outer edge 28 is slightly less than the inside diameter of the dish flange 35. Thus when the cover 11 is in place on the dish 10 the flange 35 prevents lateral movement of the cover. Outer edge 28 abuts flange 35 when the cover 11 is tipped to expose the open mouth 15 of the dish 10. The outer rim 30 of the cover 11 has a portion cut away to form an opening 34 extending inwardly from the outer edge 28 of the cover. This opening 34, as best seen in FIG. 6, extends inwardly a distance slightly short of the lip 29. The opening preferably is sufficiently large to accommodate the shank of an implement (not shown) such as a spoon or cooking thermometer.

Figure 5:
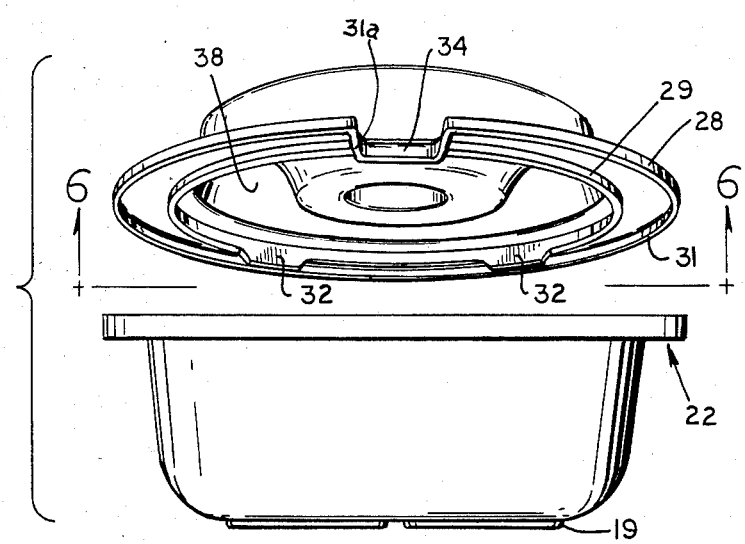
FIG. 5 is a side elevation view of the dish with the cover removed and being tipped upwardly to show details of the underside.

Extending downwardly from the underside of outer rim 30 is a first lip 29 which is concentric with the outer edge 28. When the cover 11 is in place on the dish 10 the lip 29 is disposed approximately above the edge 18 of the dish open mouth 15. Extending downwardly at the outer edge 28 of the rim 30 is a second lip 31. When the cover 11 is in place on the dish 10, the second lip 31 contacts the ledge 24 of the dish rim 22 and supports the cover 11 on the dish. A pair of spaced lugs 32 protrude downwardly from lip 29. Second lip 31 also includes a section 31a (FIG. 6) which defines the perimeter of the opening 34. In combination with the lugs 32 the section 31a forms a base for raising the rim 30 slightly above any flat surface upon which the cover 11 is placed. As best shown in FIGS. 3 and 5, lip section 31a functions to completely block access to the interior of the dish 10 when the opening is positioned over the ledge portion 24b. The portion of lip section 31a extending inwardly from edge 28 angles downwardly at approximately the same angle as ledge 24.

Figure 8:
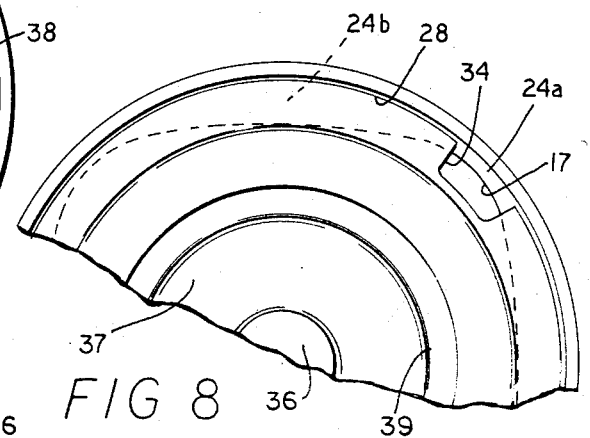
FIG. 8 is a fragmentary top plan view of the disclosed dish with the cover in place, illustrating the unblocked opening into the dish.

It can now be seen with particular reference to FIG. 8 that the opening 34 formed in the outer rim 30 of the cover 11 provides access into the interior of the dish 10 whenever the dish is covered so that the opening 34 is aligned with one of the corners 17 of the open mouth 15. The opening 34 thus provides access to the interior of the dish for inserting an implement such as a cooking thermometer. The opening also functions as a vent to permit steam to escape from the interior of the dish. The open mouth 15 of the dish 10 must be shaped to provide at least one location at which an angular placement of the cover 11 on the dish 10 results in opening 34 being unblocked. Since there are four corners 17 in the preferred embodiment, access to the interior of the dish 10 can be accomplished by rotating the cover not more than 45° in any direction.

By rotating the cover 11 relative to the dish 10, the opening 34 of the cover can be made from a position over relatively narrow ledge portion 24a to a position over relatively wide ledge portion 24b. As best shown in FIG. 3, in this position the opening is completely blocked and the interior of the dish becomes inaccessible. Thus the relatively wide ledge portion 24b forms a blocking means which effectively obstructs access to the interior of the dish 10. The dish 10 must include at least one relatively wide ledge portion 24b so that at least one angular placement of the cover 11 on the dish 10 results in the opening being blocked. Since there are four relatively wide ledge portions 24b in the preferred embodiment, the opening 34 can be blocked by rotating the cover not more than 45° in any direction.

Various advantages are derived from this design. For example, the effective unblocked area of the opening 34 can be adjusted to any position between maximum unblocked and completely blocked by selecting the appropriate angular position of the cover 11 on the dish 10. It should also be noted that at any angular placement of the cover 11 on the dish 10 the outer rim 30 is positioned over the ledge 24. Condensation on the underside of the rim 30 falls on the ledge 24 and is directed towards the open mouth 15 of dish 10.

As mentioned previously, the relatively wide ledge portions 24b also function as handles. In the unblocked position opening 34 is positioned at an angle removed from the relatively wide ledge portions 24b. Thus steam escaping from the interior of the dish will not be directed towards the user's hand when the dish is being grasped. It is also less likely that steam will condense in the area of ledge portion 24b. The slope of the ledge 24 downward toward the dish open mouth 15 also directs condensed steam or other liquid toward the interior of the dish.

It should be apparent that the foregoing relates only to a preferred embodiment of the present invention, and that numerous modifications and changes may be made therein without departing from the spirit and scope of the invention defined in the following claims.

I claim:

1. An apparatus for cooking, serving and storing food and the like, comprising:

a dish having a bottom wall and a side wall extending upwardly therefrom forming an open mouth;

a cover having an outer rim with an upwardly facing opening therein;

said open mouth having four outwardly arcuate sides interconnected by four corners to define an edge;

a dish rim extending outwardly from said edge;

said dish rim having an upwardly facing ledge thereon with a relatively wide portion positioned adjacent each of said sides and a relatively narrow portion positioned adjacent each of said corners;

said upwardly facing ledge and said upwardly facing opening cooperating to define an effective unblocked area at various positions of said cover on said ledge;

said cover being rotatable on said upwardly facing ledge between a position over one of said relatively narrow portions wherein the effective unblocked area of said upwardly facing opening is maximized and a position over one of said relatively wide portions wherein said upwardly facing opening is completely blocked; and said effective unblocked area gradually decreases as the upwardly facing opening is rotated from a position over said relatively narrow ledge portion to a position over said relatively wide ledge portion.

2. The apparatus as in claim 1, wherein said dish rim includes an upwardly extending generally circular flange which circumscribes said upwardly facing ledge.

3. The apparatus as in claim 2, wherein said upwardly facing ledge angles downwardly from said flange toward said edge to direct condensation toward the interior of said dish.

4. The apparatus as in claim 3, wherein said upwardly facing opening is rotatable approximately 45° between the position over a relatively narrow ledge portion and the position over an adjacent relatively wide ledge portion.

5. The apparatus as in claim 4, wherein said relatively wide ledge portions form oppositely positioned handles.

6. The apparatus as in claim 3, wherein said cover outer rim has an underside, a lip section extends downwardly from said underside and defines the perimeter of said upwardly facing opening, said lip section engages said upwardly facing when said upwardly facing opening is positioned over a relatively wide ledge portion.

* * * * *